(12) United States Patent
Jiang et al.

(10) Patent No.: US 9,111,073 B1
(45) Date of Patent: Aug. 18, 2015

(54) PASSWORD PROTECTION USING PATTERN

(71) Applicants: Juliang Jiang, Nanjing (CN); Jing Cao, Nanjing (CN); Xiangdong Ruan, Nanjing (CN)

(72) Inventors: Juliang Jiang, Nanjing (CN); Jing Cao, Nanjing (CN); Xiangdong Ruan, Nanjing (CN)

(73) Assignee: Trend Micro Inc., Tokyo (JP)

( * ) Notice: Subject to any disclaimer, the term of this patent is extended or adjusted under 35 U.S.C. 154(b) by 43 days.

(21) Appl. No.: 13/680,834

(22) Filed: Nov. 19, 2012

(51) Int. Cl.
*G06F 21/31* (2013.01)

(52) U.S. Cl.
CPC ...................................... *G06F 21/31* (2013.01)

(58) Field of Classification Search
CPC ......... H04L 9/32; H04L 9/3226; H04L 63/08; H04L 63/083; G06F 21/30; G06F 21/31; G06F 21/36; G06F 221/2103
USPC .............................................................. 726/6
See application file for complete search history.

(56) References Cited

U.S. PATENT DOCUMENTS

| | | | |
|---|---|---|---|
| 5,008,847 A | 4/1991 | Lapeyre | |
| 5,559,961 A | 9/1996 | Blonder | |
| 6,209,104 B1 * | 3/2001 | Jalili | 726/18 |
| 7,444,517 B2 | 10/2008 | Dayan et al. | |
| 7,468,805 B2 | 12/2008 | Lo et al. | |
| 7,844,825 B1 | 11/2010 | Neginsky | |
| 8,145,912 B2 | 3/2012 | McLean | |
| 8,321,930 B1 * | 11/2012 | Taylor et al. | 726/17 |
| 8,868,919 B2 | 10/2014 | Barton et al. | |
| 8,884,885 B2 | 11/2014 | Liu et al. | |
| 8,931,060 B2 | 1/2015 | Bidare | |
| 2003/0140258 A1 | 7/2003 | Nelson et al. | |
| 2004/0010721 A1 | 1/2004 | Kirovski et al. | |
| 2004/0073809 A1 | 4/2004 | Keong | |
| 2004/0139331 A1 * | 7/2004 | Sanai et al. | 713/184 |
| 2004/0230843 A1 | 11/2004 | Jansen | |
| 2005/0044425 A1 | 2/2005 | Hypponen | |
| 2005/0160297 A1 * | 7/2005 | Ogawa | 713/202 |
| 2005/0246138 A1 | 11/2005 | Park | |
| 2006/0174339 A1 | 8/2006 | Tao | |
| 2007/0001950 A1 | 1/2007 | Zhang et al. | |
| 2007/0157299 A1 * | 7/2007 | Hare | 726/9 |
| 2008/0098464 A1 * | 4/2008 | Mizrah | 726/5 |
| 2008/0235788 A1 | 9/2008 | El Saddik et al. | |
| 2008/0244700 A1 * | 10/2008 | Osborn et al. | 726/2 |
| 2009/0044282 A1 | 2/2009 | Govindaraju | |

(Continued)

OTHER PUBLICATIONS

Office Action in U.S. Appl. No. 14/037,314, dated Nov. 26, 2014.

(Continued)

*Primary Examiner* — Darren B Schwartz
(74) *Attorney, Agent, or Firm* — Beyer Law Group LLP (57) ABSTRACT

A user generates a pattern in a matrix (or two-dimensional grid) and enters a user name and an associated password. This username, password and pattern are stored locally on a computing device or are transmitted to a remote computer server for later authentication. Upon authentication, an input matrix is displayed. The user enters the password into the matrix in the form of the pattern, and also enters the username. The computer retrieves the previously stored pattern and password with the username. The previously stored pattern is used to read the input password from the input matrix. A match with the stored password indicates authentication. Alternatively, the input matrix only includes the pattern and password is entered separately. The input matrix may also be filled with random characters to improve security. The stored pattern is compared to the input pattern using image analysis or by comparing a set of coordinates.

22 Claims, 11 Drawing Sheets

(56) References Cited

U.S. PATENT DOCUMENTS

| | | |
|---|---|---|
| 2009/0091530 A1 | 4/2009 | Yoshida |
| 2009/0210939 A1 | 8/2009 | Xu et al. |
| 2009/0235197 A1 | 9/2009 | Chen et al. |
| 2009/0241185 A1* | 9/2009 | Waterland .................... 726/18 |
| 2009/0249235 A1 | 10/2009 | Kim et al. |
| 2009/0284344 A1* | 11/2009 | Craymer et al. ............ 340/5.54 |
| 2010/0024022 A1* | 1/2010 | Wells et al. .................... 726/7 |
| 2010/0281526 A1* | 11/2010 | Raghavan ........................ 726/7 |
| 2011/0016520 A1* | 1/2011 | Cohen et al. .................. 726/19 |
| 2011/0099505 A1 | 4/2011 | Dahl |
| 2011/0154035 A1* | 6/2011 | Yao et al. ...................... 713/168 |
| 2011/0307952 A1 | 12/2011 | Xie |
| 2012/0005483 A1* | 1/2012 | Patvarczki et al. ........... 713/182 |
| 2012/0066650 A1 | 3/2012 | Tirpak et al. |
| 2012/0102551 A1 | 4/2012 | Bidare |
| 2012/0252409 A1* | 10/2012 | Cao ................................ 455/410 |
| 2013/0009987 A1 | 1/2013 | Takishita |
| 2013/0097697 A1 | 4/2013 | Zhu et al. |
| 2013/0133053 A1* | 5/2013 | Akunuru ........................ 726/7 |
| 2014/0289870 A1 | 9/2014 | Selander et al. |

OTHER PUBLICATIONS

Office Action in U.S. Appl. No. 14/037,314, dated Apr. 2, 2015.

* cited by examiner

| USER NAME | MAX JIANG |
| --- | --- |
| PASSWORD | 9 8 7 6 5 4 3 2 1 |

|   | 1 | 2 | 3 | 4 | 5 |
|---|---|---|---|---|---|
| 1 | 5 | 2 | 3 | 4 | 5 |
| 2 | F | 3 | 6 | A | 1 |
| 3 | A | F | F | F | F |
| 4 | 3 | W | O | R | D |
| 5 | W | 6 | D | 1 | 2 |

520

| USER NAME | |
|---|---|

530

INPUT USER INTERFACE

INPUT USER INTERFACE

FIG. 10

ALTERNATE COORDINATE SYSTEM

PASSWORD PROTECTION USING PATTERN

FIELD OF THE INVENTION

The present invention relates generally to use of computer passwords. More specifically, the present invention relates to more securely protecting such passwords using an associated pattern.

BACKGROUND OF THE INVENTION

As is known, computer passwords are used to authenticate an individual for a wide range of activities including logging on to a computer, gaining access to a mobile telephone, signing in to a Web site, etc. Thinking up appropriate passwords and then trying to remember them can be a constant effort for a computer user as well as troublesome.

Complex passwords—preferred by administrators and online services—can be forgotten more easily by a user, or may be written down by a user in a discoverable location. Choosing a simple password makes it easier for the user to remember it, but then it may not be secure. Simple passwords can more easily be "hacked" by an unscrupulous person who then gains access to the user's account. Hackers will often use a "brute force" attack in order to crack a simple password.

Therefore, while a user may wish to choose a simple password, often he or she is forced into choosing a complex password because of the requirements of the system administrator or of the online service. It would be desirable to provide further protection for passwords in general and for simple passwords as well, so that even simple passwords cannot be hacked.

SUMMARY OF THE INVENTION

To achieve the foregoing, and in accordance with the purpose of the present invention, a technique is disclosed that uses an associated pattern in order to further protect any password.

In one embodiment, a user's identity is established using a pattern and password. A grid or other two-dimensional area (such as a matrix) is presented to the user and the user generates a pattern. A set of coordinates or matrix elements that define the generated pattern may then be developed. The user enters a user name (or other unique user identifier) and an associated password. This username, the password and the set of coordinates for the pattern are then stored locally on a computing device or are transmitted over a network to a remote computer server for later authentication of the user. The image of the pattern may be transmitted for later use, or the set of coordinates of the pattern may be transmitted. The password may be entered separately from the pattern by the user, or the password may be entered directly into the grid in order to form the pattern.

In a second embodiment, a user attempts to be authenticated. An interface is displayed to the user that includes an input grid or input matrix. The user enters his or her password into the grid in the form of the pattern that the user has previously established. The user also enters his or her username or other user identifier. The remaining elements of the grid (not including where the password has been entered) may be filled in with other random characters in order to secure entry of the pattern and password. Alternatively, the user draws or otherwise indicates the previously stored pattern on the input grid and enters his or her password separately from the grid. The username, pattern and password are then submitted to a local computing device or transmitted to a remote computer server for authentication.

In a third embodiment, a local computing device or a remote computer server authenticates the user using the received pattern, password and username. The received grid or matrix may include the password that forms the pattern, or, the pattern may be received separately from the password. Using the username, the computer retrieves a previously stored pattern (or its coordinates) and the previously stored password. The previously stored pattern is used to read the input password from the input grid or matrix. The input password is then compared to the previously stored password and a match indicates that the user has been authenticated.

One advantage of the present invention is that a brute force attack on a password becomes much more difficult. Assuming that the password character space is M and that the maximum password length is N, this means that a brute force attack may need to attempt a maximum of $M^N$ times in order to achieve success. The simple average attack would then take $M^N/2$ attempts. When using the present invention, however, and assuming that a matrix having dimensions of length L and width W is used, a brute force attack will need to attempt a maximum of $M^{(L*W)}$, with $M^{(L*W)}/2$ being the average number of attempts needed. Assuming that the maximum password length is N=9, and that a 5×5 matrix is used, this means that a prior art brute force attack would only need a maximum of $M^9$ attempts, but that a brute force attack upon a password protected by the present invention would need up to $M^{25}$ attempts.

Considering a more simplistic example, assuming that only decimal digits are used for the character space (M=10), and that the maximum password length is only four characters (N=4), this means that a prior art force attack may only need as many as 10,000 attempts in order to crack a password. If protected by the present invention using only a 4×4 matrix, a brute force attack would need up to $10^{16}$ attempts, which is a very large number.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, associating a particular pattern with a user password provides much greater security for that password. When authenticating, the user is asked to supply not only his or her password, but also the associated pattern. If the password and associated pattern match what has been previously stored then the user is authenticated. Establishing the password and pattern, and eventually authenticating the user, may take place upon any standalone computing device such as a laptop computer, desktop computer, tablet computer, mobile telephone, etc. In addition, any of these computing devices may be used not only to establish a password and pattern on a remote computer server, but also to authenticate the user to that remote computer server. For example, these devices may be communicating over a local area network, wide area network, or the Internet (via a wired or wireless connection) in order to communicate with the remote computer server, such as a cloud server. In particular, the present invention may be used to authenticate a user using a local computing device to a remote in-the-cloud server associated with an online service, although the invention is not so limited.

Establish Pattern and Password

Figure 1:
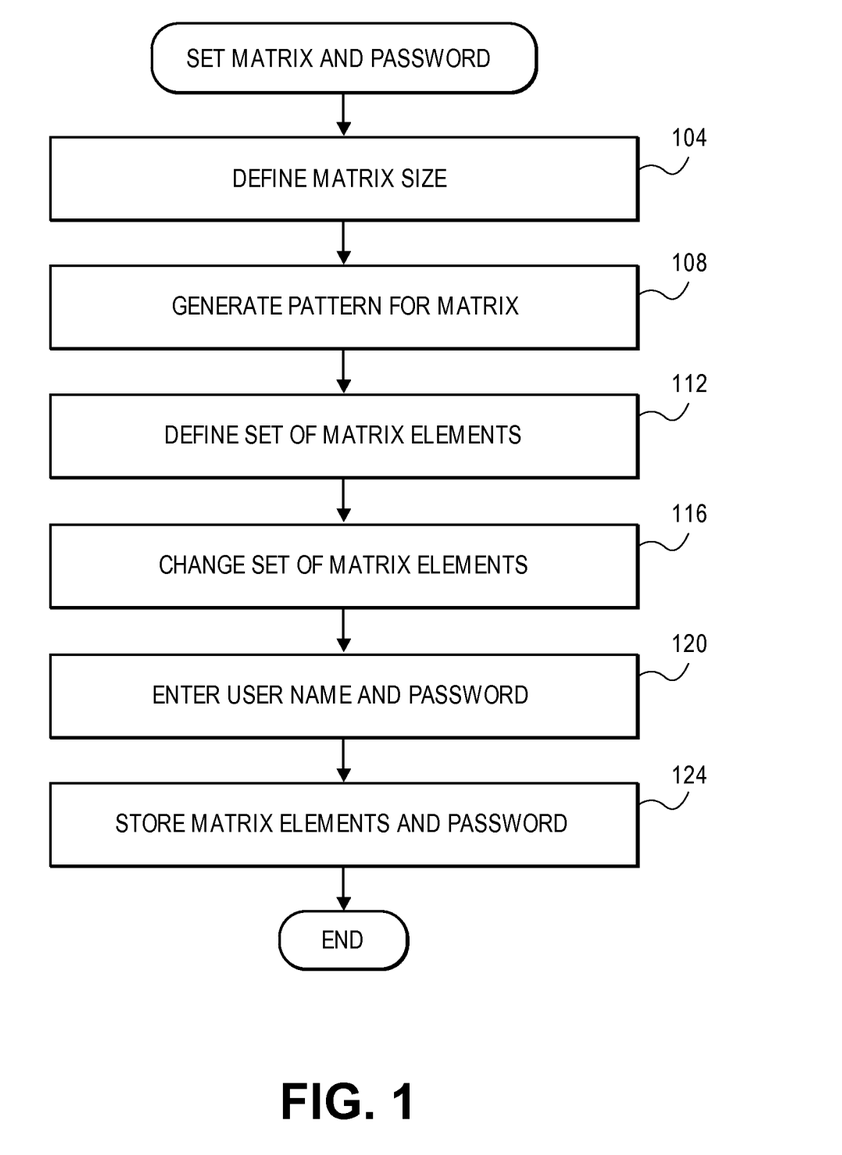
FIG. 1 is a flow diagram describing one embodiment by which a password and associated pattern are established for a computer user.
Figure 2:
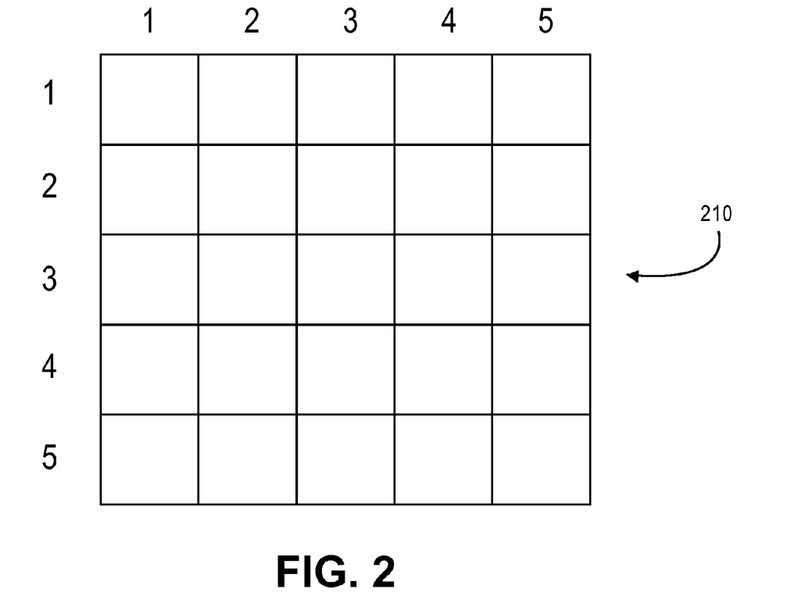
FIG. 2 shows a matrix that may be used by the user to enter his or her pattern to be associated with his or her password.

FIG. 1 is a flow diagram describing one embodiment by which a password and associated pattern are established for a computer user. In step 104 a particular matrix size is defined for use by the user in entering a particular two-dimensional pattern. For example, FIG. 2 shows a 5×5 matrix 210 that may be used by the user to enter his or her pattern to be associated with his or her password. Of course, matrix 210 is only one example; the two-dimensional matrix may be of any size, and may contain any number of elements, although the size of the matrix will be restricted by the size of the user's display screen, and should be large enough so that the user can enter his or her pattern. The size of the matrix used may be a default size set by the operating system of the computing device, a system administrator, a particular online service needing a password, or other entity. Or, it is also possible that the user is prompted by the system to input a desired matrix size for his or her use. In general, a larger matrix with more elements will provide greater security, although a smaller matrix may fit more easily on the user's display screen. And, although a rectangular matrix as shown, any coordinate scheme for mapping a user's pattern may be used to define that pattern in two-dimensional space.

Once the matrix size has been determined (by default, by the user, or other), a pattern is generated for use with the user's password. It is also possible to generate a pattern first, and then have the system automatically choose a matrix size that accommodates the user's pattern. A pattern maybe generated in a variety of ways.

Figure 3:
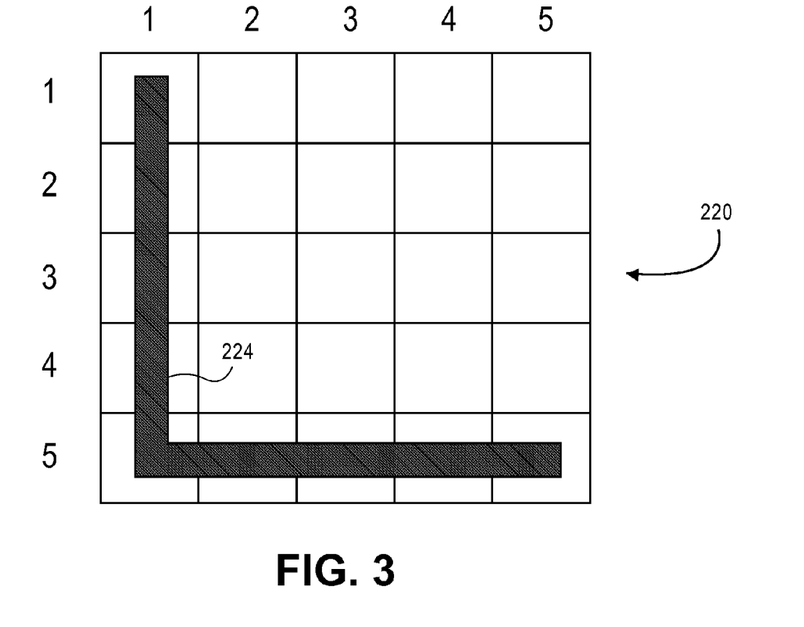
FIG. 3 shows one example of a pattern found within a matrix.

FIG. 3 shows one example of a pattern 224 found within a matrix 220. One way to generate a pattern is to provide a user with a number of templates, or proposed patterns, and then let the user choose a pattern. Of course, the greater the number of templates, the greater the security. Or, the user may select from any of a number of characters, numbers, symbols, punctuation, etc., that are commonly found and available within a computer software program for inserting into a text document. The user may select this character or symbol by clicking on the character or symbol on a graphical user interface on his or her display screen. In addition, it is also possible for the user to draw his or her preferred pattern on a computing device having a touchscreen using his or her finger, stylus, mouse, etc. Or, the user may use his or her computer mouse or other input device to individually select matrix elements in order to produce his or her desired pattern. Pattern 224 is similar to the character "L" and may have been chosen by the user from a set of templates, by clicking on the letter, by drawing with his or her finger, etc. This pattern may be generated on a blank display screen, or may have been input directly on to the displayed matrix 220.

Figure 4:
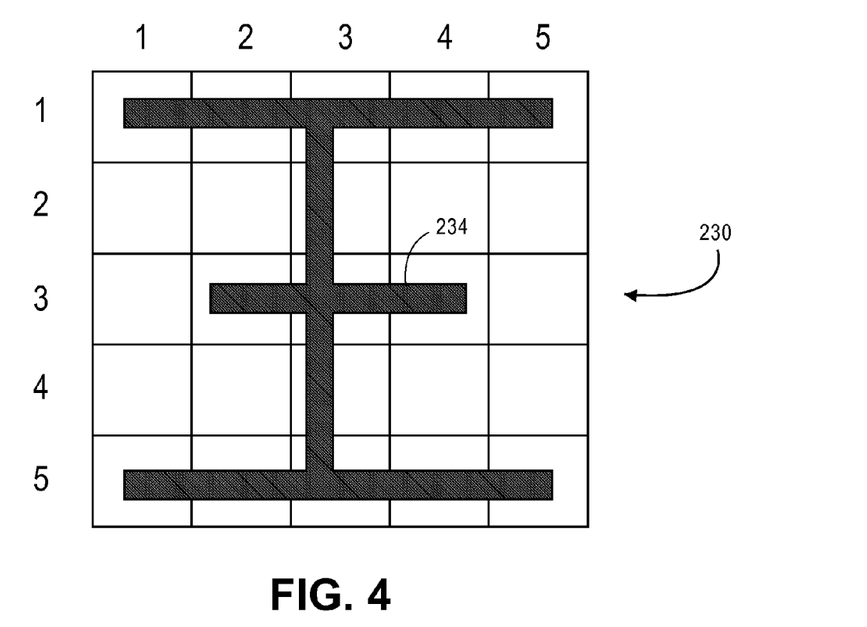
FIG. 4 is another example of a pattern within a matrix.
Figure 5:
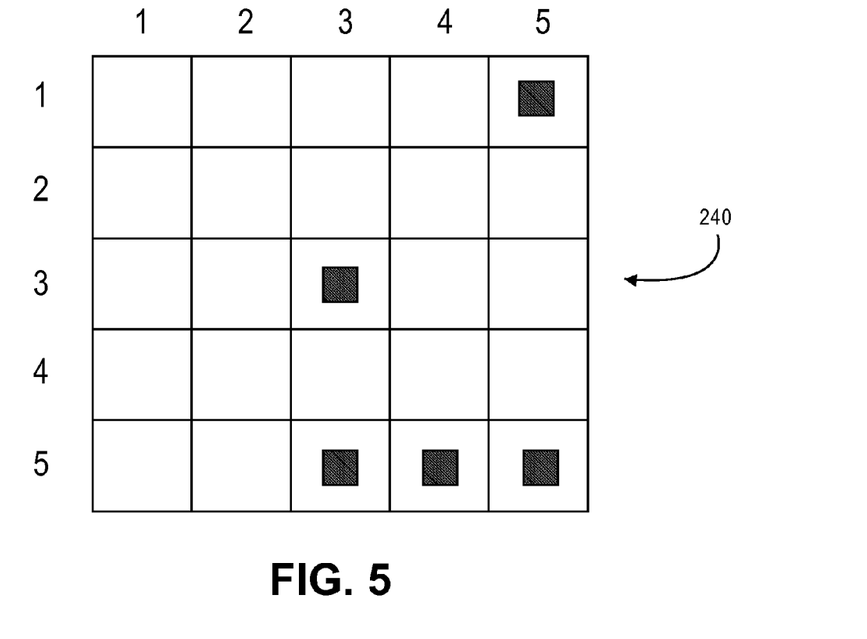
FIG. 5 is yet another example of a pattern chosen by the user within a matrix.

FIG. 4 is another example of a pattern 234 within a matrix 230. This pattern is a particular Chinese character. FIG. 5 is yet another example of a pattern chosen by the user within a matrix 240. As shown, this pattern includes the five matrix elements 241-245. Thus, the pattern chosen by the user need not be a recognized character or symbol, but may be any random selection of elements within a two-dimensional matrix or other two-dimensional area. In fact, it is not strictly necessary that the user choose his or her pattern; the computing device may also randomly select a character or symbol, or may randomly generate a pattern such as shown in matrix 240 for use by the user.

Figure 6:
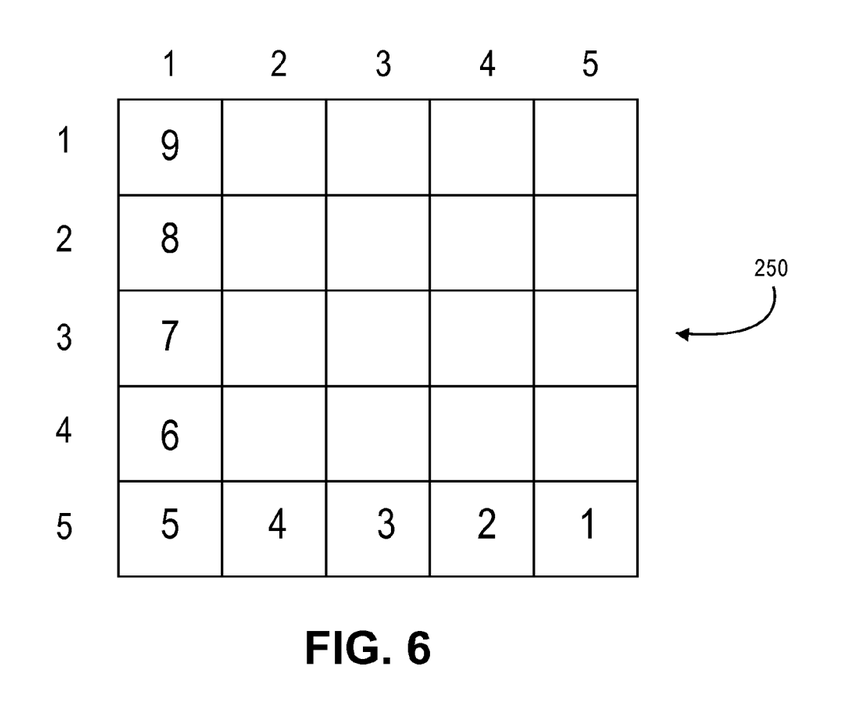
FIG. 6 shows yet another embodiment by which the user may generate a particular pattern for use with his or her password.

FIG. 6 shows yet another embodiment by which the user may generate a particular pattern for use with his or her password. In this example, instead of choosing a pattern separately from entering his or her password, the user delineates a pattern by entering his or her chosen password in particular matrix elements. In this example, the pattern of matrix 250 is the same as pattern 224 (basically, an "L"), but has been delineated by the user by entering his or her password "987654321" in particular matrix elements in order to define that pattern. It is also possible for the user to select, draw, or be assigned, a pattern such as pattern 224, and then type in his or her pattern superimposed over pattern 224 in order to enter the user password in that fashion. Also, the password need not be entered into a blank matrix, but the remaining portion of the matrix (aside from the entered password) may have randomly assigned characters, numerals, symbols, etc. When transmitting the pattern of FIG. 6 to the computing device or to a remote server, the elements forming the password may have a special flag associated with each one in order to indicate that these elements form the pattern.

In step 112, once a pattern has been indicated using any of the above techniques, the computing device (or remote server) determines what are the set of matrix elements that define that pattern. For example, pattern 224 is defined by the matrix elements: (1, 1), (2, 1), (3, 1), (4, 1), (5, 1), (5, 2), (5, 3), (5, 4), (5, 5). Of course, any coordinate scheme for defining a particular pattern within a two-dimensional space may be used and is not limited to rectangular matrices, Arabic numerals, square matrix elements, etc. This set of matrix elements may be determined by the local computing device on which the pattern is generated, or may be determined by a remote computer server after the pattern has been transmitted to that server. This set of matrix elements has a particular order, although it is not necessary for the user to draw the pattern in this particular order. For example, pattern 224 may be drawn from right-to-left and from bottom-to-top instead of the other way around. Or, pattern 234 may be drawn using horizontal and vertical strokes in any sequence. It is even possible for the user to select the individual matrix elements of pattern 234 in a random order in order to finally generate the pattern 234. By convention, though, the set of defined matrix elements will have a particular order and may use any convention desired. Examples given, the convention is that matrix elements are listed within the set by reading the generated pattern from top-to-bottom and from left-to-right.

Step 116 is an optional step in which the user may change his or her pattern if desired. The pattern may be changed by erasing and generating a new pattern, modifying an existing pattern, redefining the set of matrix elements, etc. Once the pattern or set of matrix elements has been changed, then the new pattern or set of elements is regarded as the current pattern.

Figure 7:
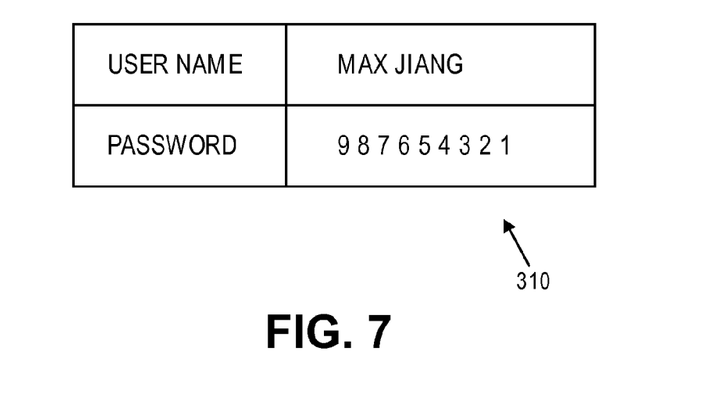
FIG. 7 is an example user interface.

FIG. 7 is an example user interface 310. In step 120 the user is prompted to input his or her username and password, such as by using interface 310. As shown, the user enters his or her username, and, if appropriate, his or her chosen password. If the embodiment of FIG. 6 is used, then the password need not be entered in this step because it would have been previously entered in matrix 250. Preferably, the user enters a password having a password length that corresponds to the length of the user generated pattern. For example, pattern 224 requires a password having a length of nine, while pattern 234 requires a password having a length of fifteen. Of course, it is not strictly necessary that the length of the input password match exactly the length of the pattern. For example, if the input password is too short, the computing device may pad the password with extra, known characters or symbols in order to create a password having the same length as the pattern. Or, if the input password is too long, the computing device may automatically chop off any of the trailing characters or symbols to create a password having the same length as the pattern. It is also preferable that the generated pattern not have duplicate matrix elements. For example, while it may be possible to modify the defined set of matrix elements to include two members (2,3) and (2,3), this would not result in a pattern distinguishable from a set having only a single member of (2, 3).

Once the pattern has been generated and the username and password entered, then in step 124 the defined set of matrix elements, the username and password may be stored in an appropriate location of the computing device or of the remote computer server. For example, the computing device may store this information locally within persistent storage, or the remote computer server may store this information in its associated database. Once this information has been stored, it may be used in the future to authenticate the user in a subsequent attempt to login to the computing device while using the pattern and password that are purported to be from that user.

As mentioned above, the user is allowed to enter his or her password directly into the input matrix or into a separate password field. The set of possible numerals, letters, characters and symbols that are allowed for the password form the password space. For the purposes of this application, the term symbol refers to any numeral, letter, character, punctuation mark or symbol that may be used entered by a user into a computing device to form a password. The term alphanumeric character is defined less broadly, and means any numeral, letter, character, or punctuation mark commonly found on a computer keyboard or other input screen that is typically entered by a user as part of a password.

Also referred to above is the username. As known in the art, a user's username is a string of letters, characters, numerals etc. that identify a particular user. As used herein, a username may be any suitable identifier that uniquely identifies a particular user within a particular computing system or within an online service.

Authenticate User

Figure 8A:
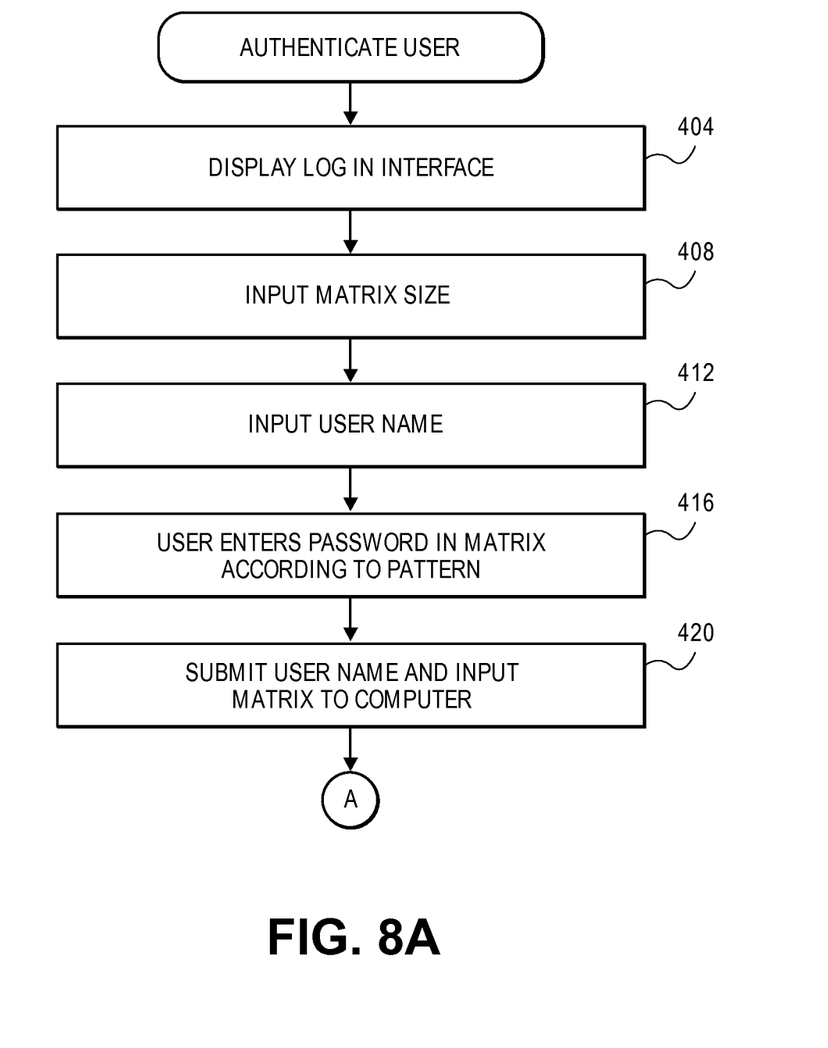
FIGS. 8A and 8B are a flow diagram describing one embodiment by which a user is authenticated using a password and an associated pattern.
Figure 8B:
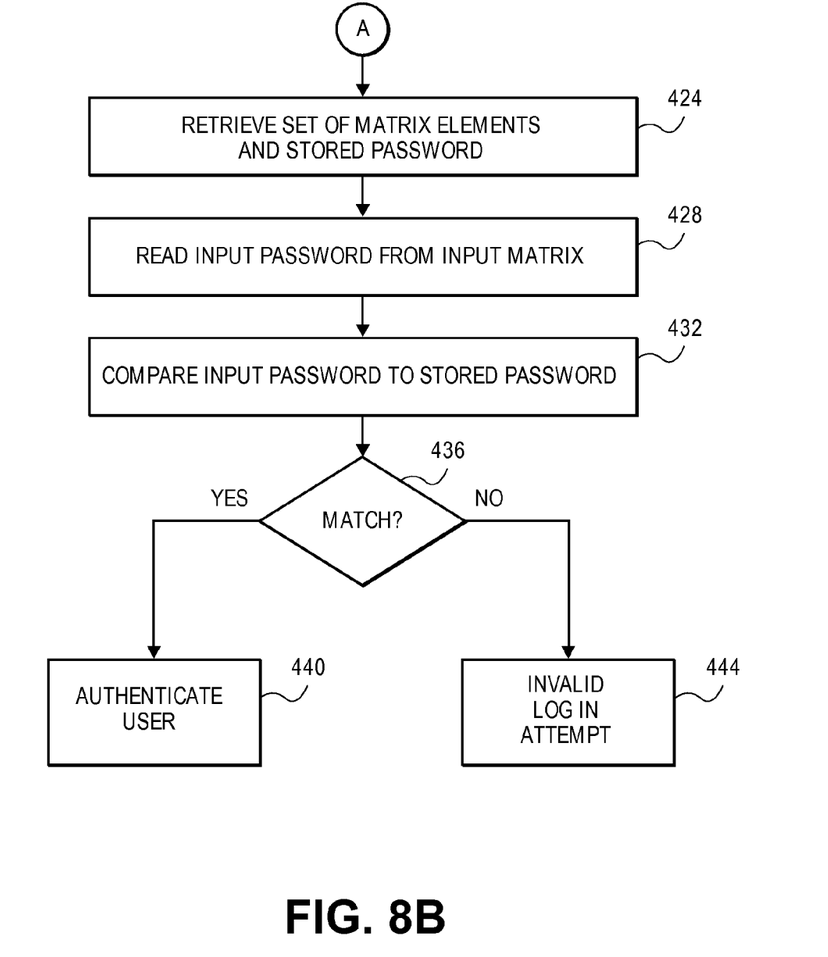

FIGS. 8A and 8B are a flow diagram describing one embodiment by which a user is authenticated using a password and an associated pattern. As described above, the user has previously generated a pattern and an associated password which have both been stored in conjunction with a username on a local computing device or remotely on a computer server.

In step 404 the local computing device displays a login interface for the user which has been generated either locally or at a remote computer server. The interface may be in any suitable form and may, for example, appear as shown in the interface 310 where the user is prompted for a username and password, or, preferably, where the user is prompted for a username and an input matrix is supplied.

Figure 9:
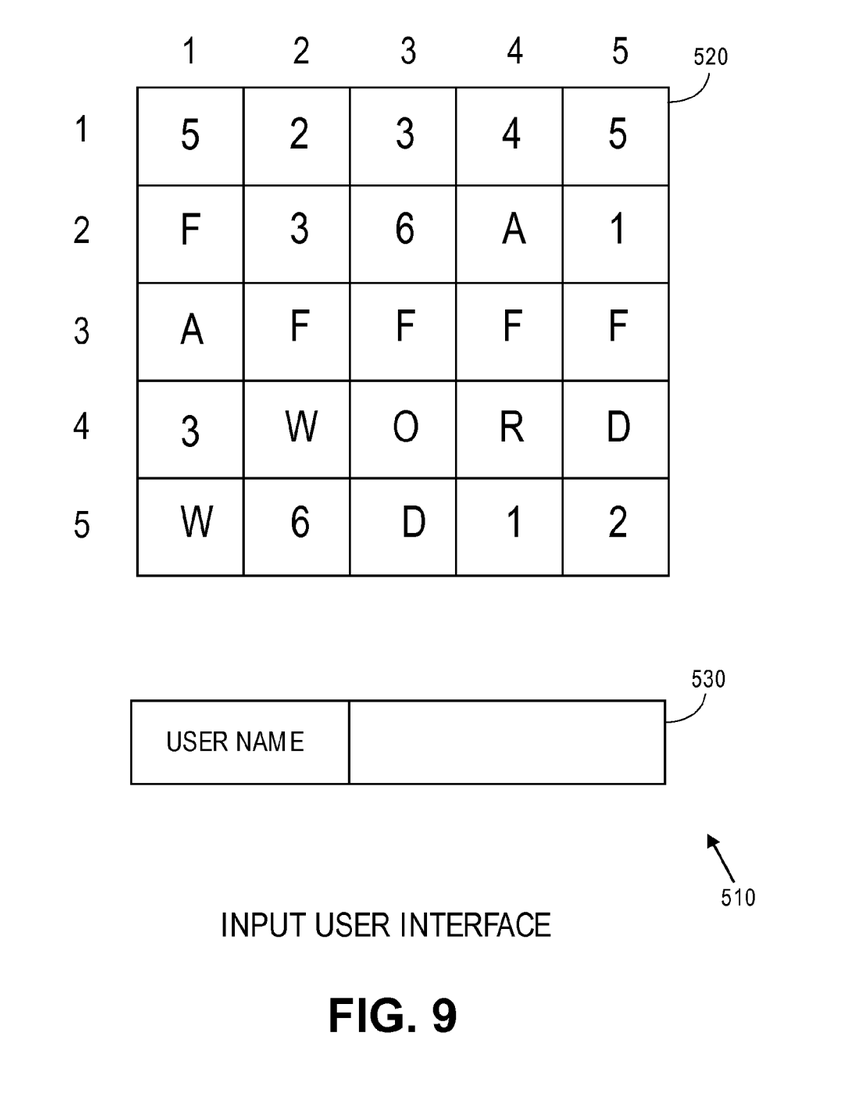
FIG. 9 illustrates an example input user interface having an input matrix and a username input field.

FIG. 9 illustrates an example input user interface 510 having an input matrix 520 and a username input field 530. In this example, a specific size matrix is provided to the user. Although matrix 520 is shown as having all of its elements filled in with characters and numbers, it is possible to present a blank matrix to the user as well, or matrix that is partially filled in. In this example, the user will provide the associated pattern by way of inputting their password into matrix 520. In step 408, which is optional, the user may be allowed to input a desired matrix size. For example, matrix 520 would not be initially presented to the user, but the user would have to indicate that he or she desired a 5×5 matrix in which to enter their pattern and password. Once the desired matrix size is entered, then matrix 520 may be presented to the user. Input of the matrix size by the user provides another level of security because a hacker may not know the correct matrix size. In step 412 the user enters his or her username in field 530.

Figure 10:
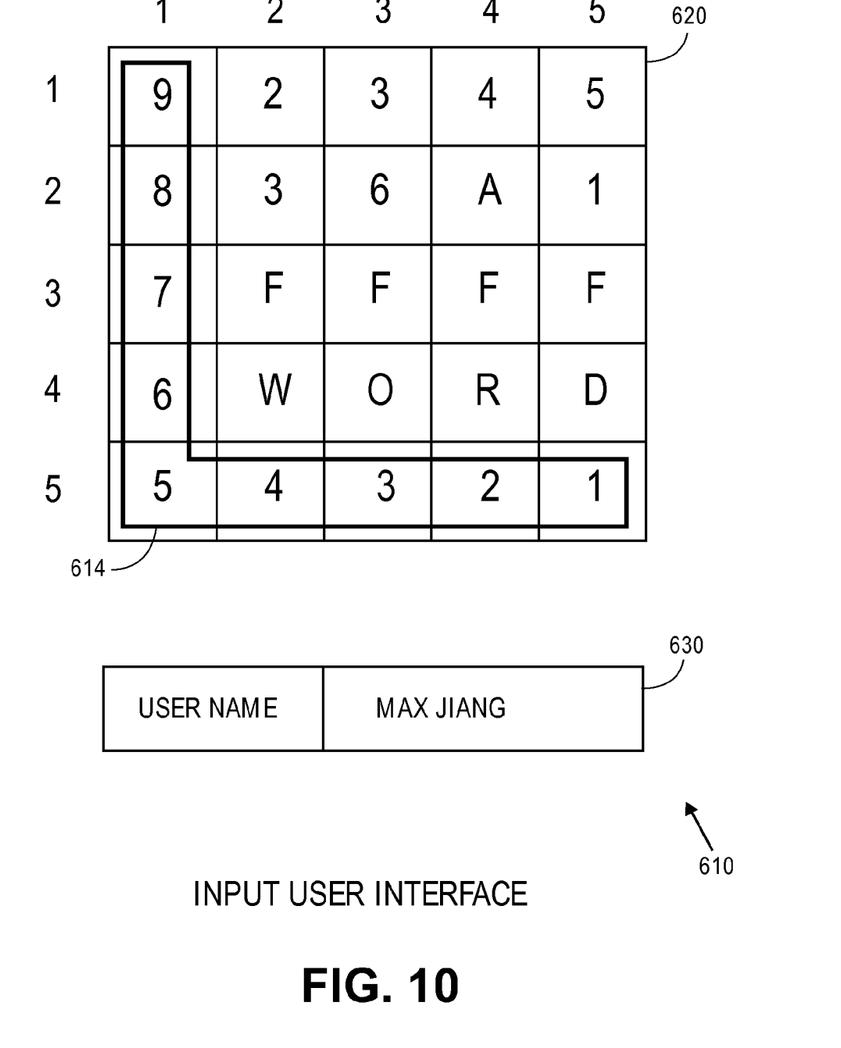
FIG. 10 illustrates the example input user interface after the user has entered his or her information.

FIG. 10 illustrates the example input user interface 610 after the user has entered his or her information. In step number 416 the user preferably enters his or her password into matrix 620 according to the pattern he or she has previously generated. As shown, matrix 620 now includes the password "987654321" in the form of pattern 614 which matches the previously generated pattern 224. By entering the password directly into matrix 620 in the form of the previously generated pattern the user kills two birds with one stone by providing the password and the pattern in a single step. By convention, the system will read the password from the provided pattern in the sequence of top-to-bottom and left-to-right. During this convention, the user should enter his or her password as shown, otherwise there will be no match. Of course, another convention may be used by the system, as long as the user is aware of this convention.

As shown, matrix 620 includes a variety of other random numerals, characters and symbols that are present in the matrix outside of pattern 614. These random numerals, characters and symbols may be present in matrix 520 when originally supplied to the user or may be filled in matrix 620 after the user has entered the password in pattern 614. If originally present in the matrix, the user may enter his or her password in pattern 614 by deleting any symbols present within the pattern and then replacing them with the correct password numeral. Or, the user interface may be designed such that it is easy for the user to overwrite any matrix element when typing the password into pattern 614.

Although not strictly necessary, the random symbols, letters and characters present in matrix 620 outside of pattern 614 provide additional security to the user. If matrix 620 is input to the computing device or transmitted to a remote computer server having only pattern 614 containing the password and the rest of the matrix elements blank, it is possible for a hacker to intercept that matrix and immediately capture the pattern and password. By filling in random characters, numerals and symbols into the rest of the matrix outside of the pattern, it becomes more difficult for a hacker to discover the pattern of password. In fact, the extra numerals, characters and symbols need not be random but may be determined beforehand, and in fact, some of the matrix elements may be blank. Preferably, the extra numerals, characters and symbols are from the same password space as the password itself. Thus, if a password is constrained to be only digits and the 26 lowercase letters, then the extra numerals and characters in the input matrix must also be selected from that set of 36 digits and letters. Restricting the extra numerals, characters and symbols in this way provides extra security for the user's password present in the matrix.

In an alternative embodiment, the password need not be entered into the matrix 620 as shown in FIG. 10. In this embodiment, the pattern 614 is entered into matrix 620, but there now are no other characters, numerals are symbols present in the matrix. In other words, input matrix 620 would appear as shown in FIG. 3 where only the user's input pattern 614 is pressed. In this embodiment the password is supplied separately, such as by using an interface similar to the interface 310, and in this fashion the user supplies not only his or her pattern but also the associated password.

Figure 12:
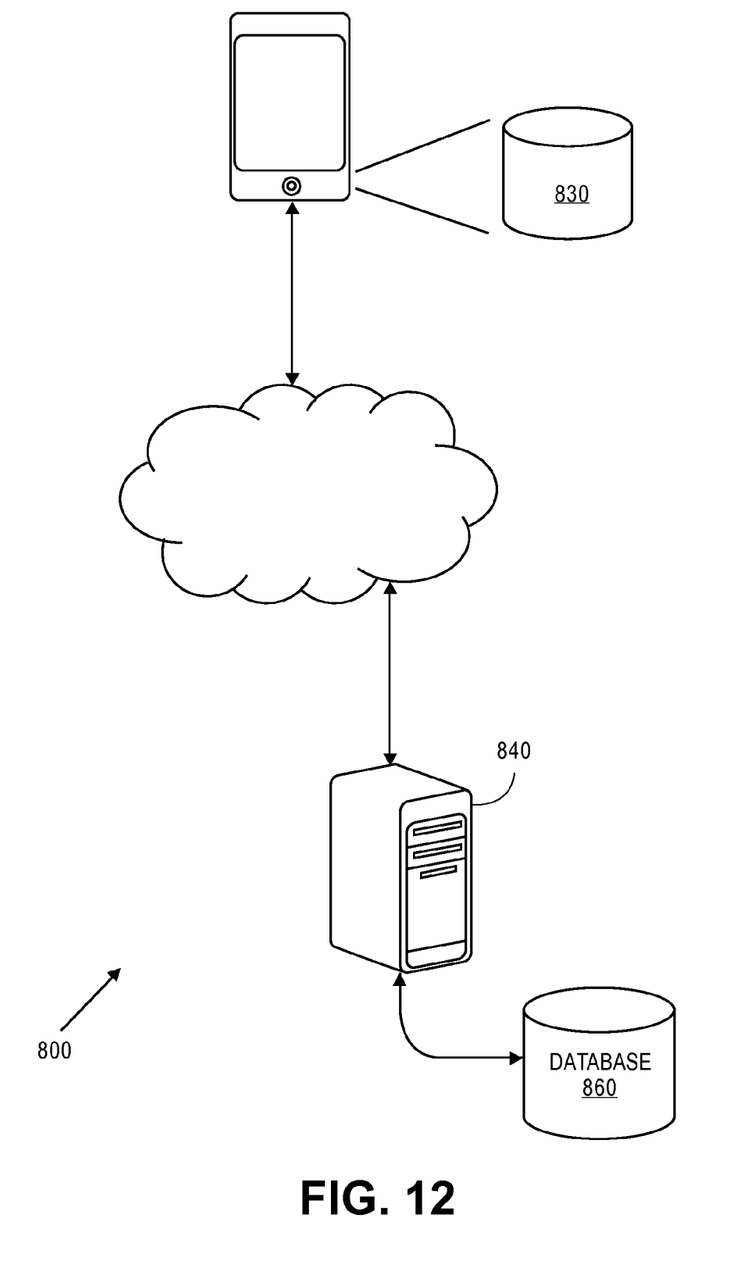
FIG. 12 illustrates a system embodiment of the invention.

In step 420 the username and input matrix 620 (or simply the pattern along with a separately input password) are supplied to the local computing device 820 or to a remote computer server 840 for authentication. Once this information has been input by the user then the local computing device or the remote computer server are able to perform authentication.

In step 424 the local computing device or a remote computer server retrieves the previously stored information associated with the user's username. As is known in the art, the username may be used as a key into a database 830 or 860 to retrieve the previously stored password for that username and the associated set of matrix elements which define the associated pattern. Alternatively, an image of the pattern in the matrix may be retrieved in order to define the matrix elements, or the retrieved image of the pattern may be compared directly to an image of the pattern in the input matrix 620.

In step 428 the password that the user has input is retrieved from input matrix 620 using the set of defined matrix elements that have been retrieved from the database 830 or 860. For example, using the previously stored set of matrix elements that define pattern 224, the input password in pattern 614 is retrieved from input matrix 620. This retrieved password from pattern 614 is then compared with the user's password previously stored in database 830 or 860. In step 432 the two passwords are compared and the match is determined in step 436. In this fashion, the patterns are determined as matched if the passwords also match in step 436. As a matrix increases in size, and password length increases, it is extremely unlikely that the passwords will match if the correct pattern is not input. Even if the correct pattern is input, the passwords will not match unless the correct password is supplied.

Alternatively, if an input password is supplied separately by the user in the alternative embodiment described above (rather than being input into matrix 620), and only the pattern is supplied in matrix 620 (such as shown in FIG. 3), then the password and pattern may be matched as follows. The password may be matched in steps 432 and 436 by simple comparison of the two passwords. To match the patterns, the set of defined matrix elements retrieved from database 830 or 860 may be used to check that the supplied input pattern is in fact the same pattern. Or, if an image of the entire matrix with the pattern has been stored in database 830 or 860, and an image of the input matrix with the pattern is supplied by the user, then these two images may be compared using standard image comparison software as is known in the art. If the patterns match and the passwords match in this alternative embodiment, then a match is declared as well in step 436.

In step 440 it is determined that the user has been authenticated and the user is permitted to log on to the computing device or to the remote computer server or online service. In step 444 it is determined that an invalid login attempt has occurred and that authentication has failed. A suitable warning message or alert is then generated and displayed or sent to the user, and displayed or sent to the computing device, system administrator, or remote computer server or online service.

Alternative Coordinate System

Figure 11:
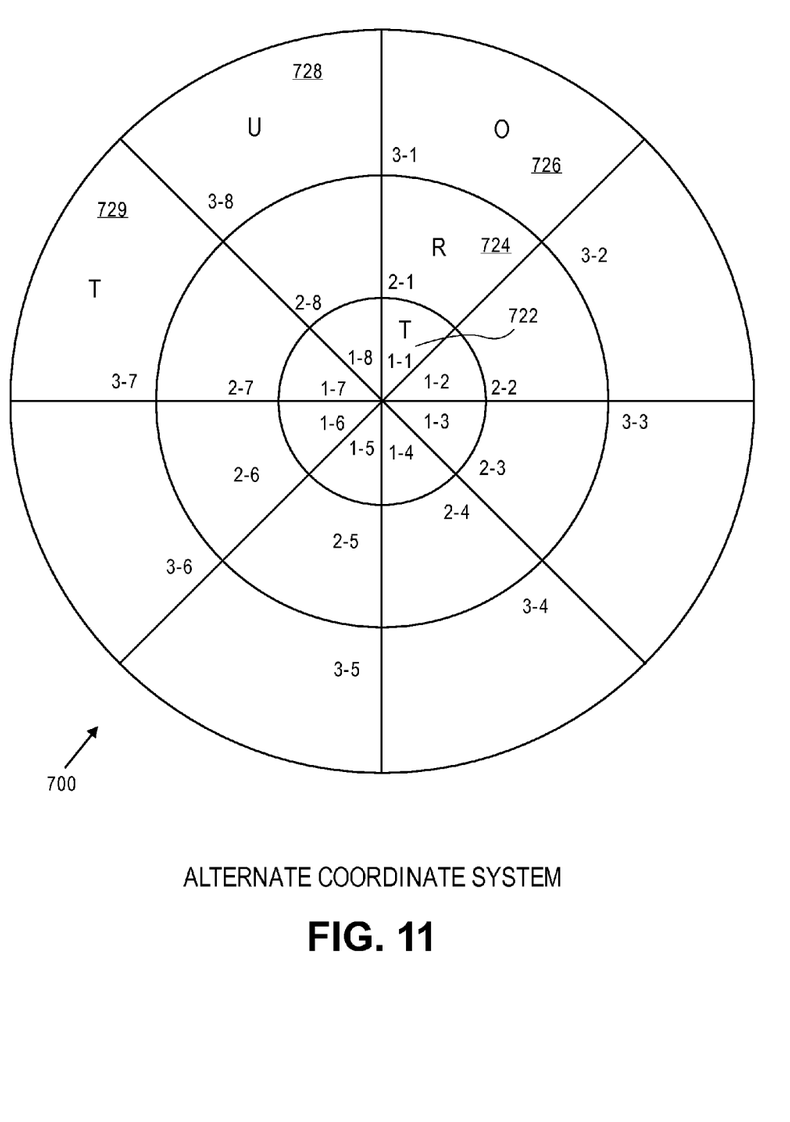
FIG. 11 shows an alternate coordinate system that may be used with an embodiment of the invention.

As mentioned above, even though a rectangular matrix is shown as being used for generating a pattern, such a matrix may be in any shape and may use any coordinate system. FIG. 11 shows an alternate coordinate system that may be used with an embodiment of the invention. In this example, the password "TROUT" is shown as occupying certain elements 722-729 of this coordinate system. A simple coordinate system may be used as shown for each element is defined by its distance from the center and its position on a circle. For example, element 724 which holds the character "R" is defined by the notation (2-1) because the element is in the second ring from the center and is in the first position of that circular ring. Or, a polar coordinate system may be used where, for example, element 726 holding the character "O" may be defined by the angle of 60° and a distance of "3" units from the center. Of course, many other shapes, coordinate systems and notations may be used to define patterns in two dimensions. In general, the term grid may be used to refer to any two-dimensional area such as a matrix, circular area, polar coordinate system, or other that may accommodate and identify a user's pattern.

System Embodiment

FIG. 12 illustrates a system embodiment of the invention 800. Shown is a local computing device 820 having associated persistent storage 830. The device may also be in communication over the Internet with a remote computer server 840. The computer server may implement any type of online service that requires authentication, or the server may itself provide an authentication service for another Web site. Server 840 has associated storage 860 having a database of information such as usernames associated with their respective patterns and passwords.

Computer System Embodiment

Figure 13A:
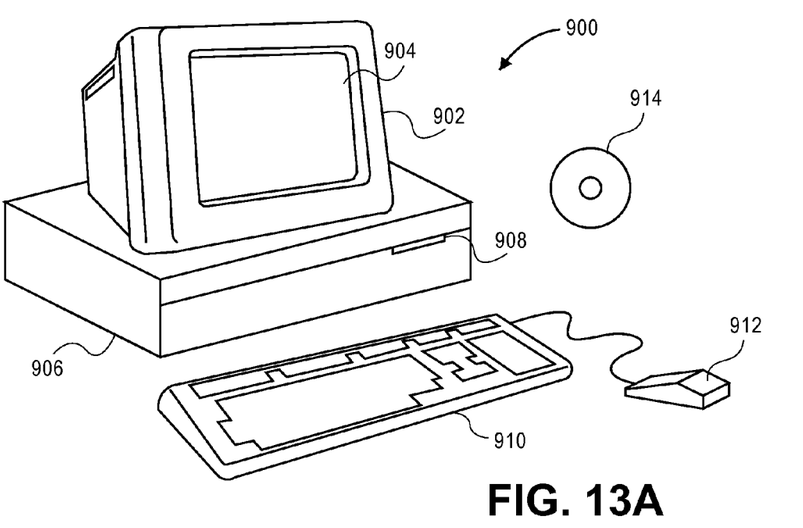
FIGS. 13A and 13B illustrate a computer system suitable for implementing embodiments of the present invention.
Figure 13B:
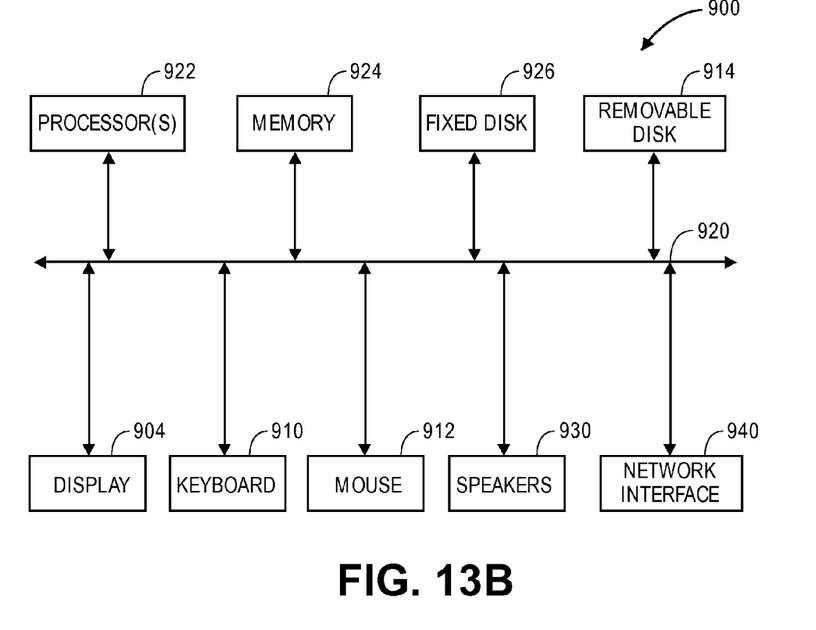

FIGS. 13A and 13B illustrate a computer system 900 suitable for implementing embodiments of the present invention. FIG. 13A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 13B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of establishing a user identity, said method comprising:
    displaying a two dimensional grid having individual elements on a display at a first computing device;
    generating, by a computer user, a two-dimensional pattern in said grid of said display of said first computing device by inserting symbols by said user into said grid, wherein said inserted symbols form a password;
    generating one or more other symbols at said first computing device within said grid, wherein said other symbols do not include said password;
    receiving, on said first computing device, a user identifier from said computer user;
    transmitting said user identifier and said grid with said user inserted symbols and said other symbols from said first computing device to a second computing device without transmitting said pattern, said inserted symbols or said other symbols outside of said grid;
    after said transmitting operation, determining a set of coordinates that define said pattern at said second computing device; and
    storing said set of coordinates, said user identifier and said password in association with one another in persistent storage of said second computing device.

2. The method as recited in claim 1 wherein said password is composed of symbols.

3. The method as recited in claim 1 wherein said password is composed of alphanumeric characters and wherein each of said inserted symbols is a different one of said alphanumeric characters of said password.

4. The method as recited in claim 1 wherein said two-dimensional pattern is generated using a matrix on said display of said first computing device, and wherein said set of coordinates define elements of said matrix.

5. The method as recited in claim 1 further comprising:
    receiving, on said computing device, input from said computer user indicating a desired matrix size; and
    displaying, at said computing device, a matrix of said size wherein said pattern is generated within said matrix and wherein said receiving of said input indicating said desired matrix size and said displaying of said matrix of said size are performed before said receiving of said one or more symbols.

6. The method as recited in claim 1 further comprising:
    after said storing, receiving input from said user defining an input password, an input user identifier and an input pattern; and
    comparing said input password, said input identifier and said input pattern to said password, said user identifier and said set of coordinates in persistent storage of said second computing device in order to authenticate said user.

7. The method as recited in claim 1 further comprising:
    assigning, at said first computing device, a flag to each of said symbols inserted by said user into said grid, said flags indicating which symbols in said grid were inserted by said user, wherein said transmitted grid includes said flags.

8. The method as recited in claim 1 wherein said first computing device automatically generates and displays said pattern in said grid at said first computing device before said user inserts said symbols into said grid.

9. The method as recited in claim 1 further comprising:
    after said storing operation, displaying a two dimensional authentication grid at a display of a computer system wherein said computer system is one selected from the group consisting of said first computing device and a third computing device;
    receiving input from said user at said computer system, said user input including one or more input symbols that are inserted into said authentication grid by said user;
    receiving an input user identifier from said user at said computer system; and transmitting said input user identifier and said authentication grid with said inserted symbols from said computer system to said second computing device without indicating which symbols in said authentication grid were inserted by said user;

retrieving, at said second computing device, said stored set of coordinates using said input user identifier;

retrieving, at said second computing device, said stored password using said input user identifier;

using, at said second computing device, said stored set of coordinates to select symbols from said received authentication grid that correspond to said stored set of coordinates, said selected symbols forming an input password;

comparing, at said second computing device, said input password to said previously stored password; and authenticating said user at said server computer when said input password matches said previously stored password.

10. The method as recited in claim 1 wherein:

said generating of said pattern includes said user selecting a particular set of said individual elements in said grid at said first computing device, said selected set including a first number of said individual elements that define said pattern;

said insertion of said symbols by said user includes said user inserting, after said selection of said set, each of said user inserted symbols into a different one of said individual elements in said selected set to form said password;

said password is formed from a second number of said user inserted symbols and said second number is less than said first number of said individual elements in said selected set such that, after said user inserted symbols are inserted into said selected set, at least one of said individual elements in said selected set does not include any of said user inserted symbols, thereby causing said selected set to be partially filled with said user inserted symbols; and said transmitted grid includes said partially filled set.

11. A method of authenticating a user, said method comprising displaying, on a first computing device, a two-dimensional grid having individual elements;

receiving input at said first computing device from a user of said first computing device that defines a pattern on said grid wherein said user input that defines said pattern includes one or more symbols that are inserted into said grid by said user;

receiving a password input from said user on said first computing device in the form of said inserted symbols;

generating one or more symbols within said grid at said first computer device wherein said generated symbols are different from said user inserted symbols and do not include said password;

receiving a user identifier from said user at said first computing device; and transmitting said user identifier and said grid with said user inserted symbols and said generated symbols from said first computing device to a second computing device without indicating which symbols in said grid were inserted by said user and without transmitting said pattern or said user inserted symbols outside of said grid; and authenticating said user using said pattern, said password input and said user identifier at said second computing device using a stored pattern, a stored password and a stored user identifier in persistent storage of said second computing device.

12. The method as recited in claim 11 wherein said password input is composed of symbols.

13. The method as recited in claim 11 wherein said password input is composed of alphanumeric characters and wherein each one of said one or more inserted symbols is a different one of said alphanumeric characters of said password input.

14. The method as recited in claim 11 further comprising:

prompting said user to input a desired grid size;

receiving a response from said user indicating said desired grid size wherein said displayed grid is of said desired size and wherein said prompting and said receiving of said response indicating said desired grid size are performed before said displaying of said grid.

15. The method as recited in claim 11 wherein:

said user input that defines said pattern includes said user selecting a set of said individual elements in said grid at said first computing device, said selected set including a first number of individual elements that define said pattern;

said insertion of said symbols by said user includes said user inserting, after said selection of said set, each of said user inserted symbols into a different one of said individual elements in said selected set to form said password;

said password is formed from a second number of said user inserted symbols and said second number is less than said first number of said individual elements in said selected set such that, after said user inserted symbols are inserted into said selected set, at least one of said individual elements in said selected set does not include any of said user inserted symbols, thereby causing said selected set to be partially filled with said user inserted symbols; and said transmitted grid includes said partially filled set.

16. A method of authenticating a user, said method comprising:

receiving input at a computer server from a computing device, wherein said input indicates a request for a grid of a desired size from a user;

after said receiving of said input, receiving, at said computer server, a two-dimensional grid with individual elements from said computing device, wherein a plurality of said elements include symbols that were inserted into said grid by said user and other symbols that were generated by said computing device and wherein said received grid is of said desired size as requested by said user and wherein said computer server does not receive any information from said computing device indicating which symbols in said grid were inserted by said user and wherein said computer server does not receive any information outside of said grid from said computing device that indicates said symbols inserted by said user;

receiving, at said computer server, a user identifier from said computing device wherein said user identifier is associated with said grid received from said computing device;

retrieving, at said computer server, a previously stored pattern from persistent storage using said user identifier;

retrieving, at said computer server, a previously stored password from persistent storage using said user identifier;

after said receiving of said input and said receiving of said two-dimensional grid of said desired size as requested by said user, using, at said server computer, said stored pattern to select symbols from said received grid that correspond to said stored pattern, said selected symbols forming an input password;

comparing, at said server computer, said input password to said previously stored password; and authenticating said user at said server computer when said input password matches said previously stored password.

17. The method as recited in claim 16 wherein said received grid includes elements having symbols other than elements of said grid that correspond to said previously stored pattern.

18. The method as recited in claim 16 further comprising:
selecting, at said computer server, symbols from said grid by superimposing an image of said previously stored pattern onto said grid.

19. The method as recited in claim 16 further comprising:
retrieving, from said persistent storage, a set of coordinates defining said previously stored pattern;
selecting symbols from said grid by using said set of coordinates.

20. The method as recited in claim 16 further comprising:
displaying on said computing device an indication that said user has been authenticated.

21. The method as recited in claim 16 wherein said symbols are alphanumeric characters.

22. The method as recited in claim 16 wherein:
said grid received at said server includes a set of said individual elements that delineate said previously stored pattern stored at said computer server in said grid, said set including a first number of said individual elements that were selected by said user;

each of said user inserted symbols are inserted into a different one of said individual elements in said set to form said input password; and said input password is formed from a second number of said user inserted symbols and said second number is less than said first number of said individual elements in said selected set such that, after said user inserted symbols are inserted into said selected set, at least one of said individual elements in said set does not include any of said user inserted symbols.

* * * * *